United States Patent
Kuehner et al.

(10) Patent No.: US 6,888,336 B2
(45) Date of Patent: May 3, 2005

(54) INVERTER FOR AN ELECTRIC MACHINE

(75) Inventors: Jochen Kuehner, Backnang-Heiningen (DE); Robert Plikat, Eningen (DE); Klaus Rechberger, Ludwigsburg (DE); Jochen Ruopp, Neckartailfingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/483,575

(22) PCT Filed: Feb. 6, 2003

(86) PCT No.: PCT/DE03/00339
§ 371 (c)(1),
(2), (4) Date: Jun. 15, 2004

(87) PCT Pub. No.: WO03/096507
PCT Pub. Date: Nov. 20, 2003

(65) Prior Publication Data
US 2004/0222766 A1 Nov. 11, 2004

(30) Foreign Application Priority Data
May 11, 2002 (DE) ........................................ 102 21 081

(51) Int. Cl.[7] ................................................ H02P 5/34
(52) U.S. Cl. ...................... 318/801; 318/254; 318/138; 318/439; 318/800
(58) Field of Search ................................ 318/801, 700, 318/254, 138, 439; 363/34, 37, 41

(56) References Cited

U.S. PATENT DOCUMENTS

| | | | | | |
|---|---|---|---|---|---|
| 3,742,330 A | * | 6/1973 | Hodges et al. | ................. | 363/41 |
| 4,554,512 A | * | 11/1985 | Aiello | ........................... | 330/10 |
| 4,933,831 A | * | 6/1990 | Takahashi et al. | ........... | 363/132 |
| 5,323,102 A | * | 6/1994 | Torii et al. | ..................... | 322/90 |
| 6,366,062 B2 | * | 4/2002 | Baretich et al. | ............. | 323/223 |

FOREIGN PATENT DOCUMENTS

DE 198 35 576 11/1999
EP 0 596 472 5/1994

* cited by examiner

Primary Examiner—Rita Leykin
(74) Attorney, Agent, or Firm—Kenyon & Kenyon

(57) ABSTRACT

An inverter for an electric machine is specified that includes a plurality of switching elements, in particular six, which are positioned in a bridge circuit and produce a connection between the electric machine and a battery. The switching elements built into the low-side branch of the inverter are ones that are conductive without a control voltage present, i.e., normally-on switching elements. That ensures that if the supply voltage is absent and the electric machine is rotating the windings of the electric machine are short circuited and no overvoltages are able to occur. In normal operation the inverter is operated like a conventional inverter, by clocked actuation, but with reversed actuation of the control electrodes, i.e., with control voltage for non-conductive time phases and without control voltage in conductive phases.

9 Claims, 2 Drawing Sheets

INVERTER FOR AN ELECTRIC MACHINE

FIELD OF THE INVENTION

The present invention relates to an inverter for an electric machine and relates in particular to inverters for starter-generators in motor vehicles which should also function in batteryless operation or when the battery is defective or discharged.

BACKGROUND INFORMATION

Conventionally, three-phase machines are operated with the help of pulse-controlled inverters. The three-phase machines are connectable to a battery through the pulse-controlled inverter. The pulse-controlled inverter includes circuit breakers, which are usually implemented as a bridge configuration having six self-locking switches. For example, such self-locking circuit breakers may be power MOSFETs, but it is also known to use other semiconductor switches, such as IGBTs or thyristor-type switches, for example MCTs, ESTs, GTOs, or similar. Embodiments having traditional bipolar power transistors are also known.

All of these switches may only be used when the voltage at the control electrode exceeds a certain positive value compared to a reference electrode, for example the source electrode or the cathode. Without control voltage, the switches used in the conventional systems cut off. Actuating the switches, i.e., feeding a voltage to the control electrodes, is usually done with the help of a control device which is for example a component of a vehicle electrical system control unit or of a voltage controller.

If the three-phase machine is a permanent-field synchronous machine, in the event of an error condition there must be assurance that it is possible to short circuit the phases of the machine or connect them with low impedance, since otherwise overvoltages may occur when the synchronous machine is running at correspondingly high speeds. It is therefore conventional, and is described, for example, in German Patent Application No. DE 198 35 576, that in the case of a three-phase machine having a pulse-controlled inverter that is designed as a permanent-field synchronous machine, in special cases depending on the error condition, by switching on single or multiple circuit breakers selectively the phases of the machine are short-circuited, so that overvoltages are prevented.

However, actuating the circuit breakers in the conventional embodiment is only possible if correct functioning of the switches, the actuating system, and the battery is ensured. If individual switches of the pulse-controlled inverter are closed and yet the supply voltage has simultaneously failed, it is no longer possible to actuate the switches and turn them on.

SUMMARY

An object of the present invention is to ensure in a system with a three-phase machine having an assigned pulse-controlled inverter that, in the event of an error when there is a threat of overvoltage, a short-circuiting or a low-impedance connection of specifiable circuit breakers is reliably possible, irrespective of detrimental marginal conditions such as a missing battery, a defective battery, or a discharged battery.

An inverter according to the present invention for an electric machine may have the advantage that, in the event of an error, specifiable phases of the electric machine are short circuited or connected at low impedance, or that the relevant switches are conductive, so that overvoltages which may possibly occur are prevented while the electric machine is rotating. These advantages may be achieved by selecting specifiable circuit breakers of the pulse-controlled inverter, preferably the three circuit breakers connected to the low-side branch, in such a way that they are conductive in the absence of control voltage and cut off when control voltage is applied. Such self-conducting circuit breakers are advantageously designed as normally-on MOSFETs. When a short circuit is recognized, the control voltage at the relevant control electrode of the switch is simply turned off, thereby putting the latter in the conductive state.

One advantageous example embodiment of the present invention is designed in such a way that parallel connection of mechanical normally-closed contacts to conventional semiconductor switches is employed. In an advantageous manner, relay contacts are provided here that are releasable by a switch-on signal. In an advantageous way, a combination of mixed and pure half-bridges with a specifiable combination of normally-on switches and normally-off switches is employed. The switches are advantageously actuated with the help of a control device, which however emits trigger signals such that they open the normally closed switches at specifiable times.

In normal operation, all inverters according to the present invention may be operated like conventional inverters, by clocked actuation, but with reversed actuation of the control electrodes, i.e., with control voltage for non-conductive time phases and without control voltage in conductive phases.

BRIEF DESCRIPTION OF THE DRAWINGS

Exemplary embodiments of the present invention are illustrated in the drawings and are explained in greater detail in the following description.

DESCRIPTION OF EXAMPLE EMBODIMENTS

Figure 1:
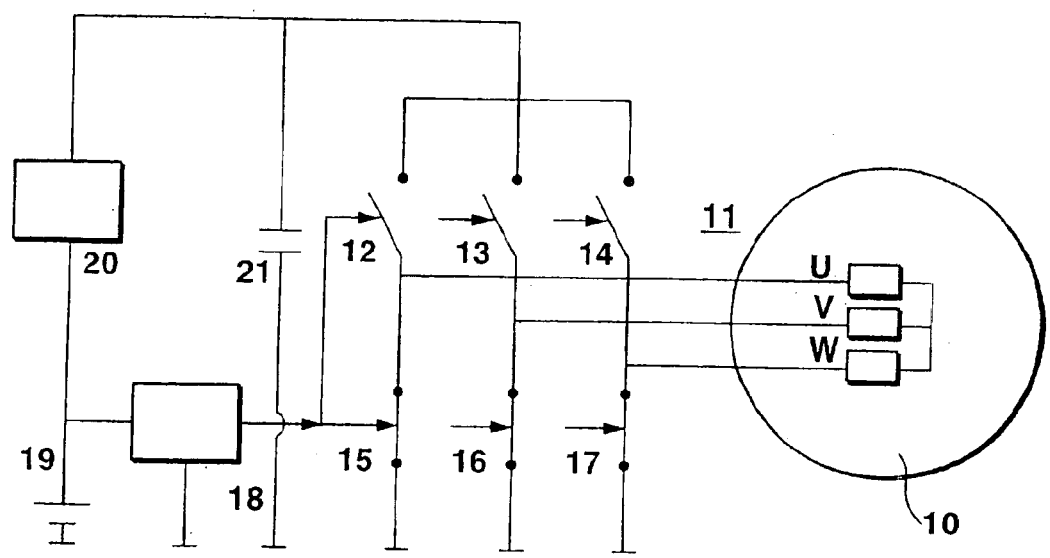
FIG. 1 shows a first exemplary embodiment of the present invention.

FIG. 1 shows a schematic representation of a voltage supply circuit for an electric machine 10, in which DC voltage is supplied to electric machine 10 via a switchable bridge or an inverter 11. Inverter 11 includes in this case three high-side switching elements 12, 13, 14 and three low-side switching elements 15, 16, 17. High-side switching elements 12, 13, 14 are for example conventional field effect transistors that are only conductive when a control voltage that exceeds a certain positive value compared to a reference electrode (source or drain) is applied to their gate electrode. The value of the control voltage is determined by the design. Low-side switching elements 15, 16, 17 in contrast are switching elements that are in the conductive state when no control voltage is present and change to the non-conductive state only when a control voltage is applied. Examples of such switching elements are normally-on field effect transistors.

Electric machine 10 is connected to inverter 11 in a normal way. The windings of the electric machine are designated as U, V, W in the figure. The switching elements of the inverter are actuated with the help of a control electronics unit 18 that feeds the requisite control voltages for optimal operation to the respective gate electrodes of the switching elements. The voltage is supplied for control electronics unit 18 in normal operation from battery 19, through a suitable voltage converter 20 if necessary. An intermediate circuit capacitor 21 is used to smooth the voltage or to buffer the electrical charge.

In normal operation, the inverter shown in FIG. 1, as well as the inverters according to the present invention shown in the subsequent figures, are operated like a conventional inverter by clocked actuation, but with reversed actuation of the control electrodes, i.e., by supplying a control voltage for non-conductive time phases and by switching the control voltage off in conductive time phases.

In place of the normally-on semiconductor switches used in the low-side branch, conventional field effect transistors may also be used in one embodiment of the present invention, in which case parallel connection of mechanical normally-closed contacts is then assigned to them. Such relay contacts are then explicitly released by a switch-on signal. One aspect of all embodiments is that the components used in the low-side branch are always conductive in the absence of a trigger signal and thus produce a short circuit. That ensures that no overvoltages are able to occur when the machine is rotating and the supply voltage fails.

Figure 2:
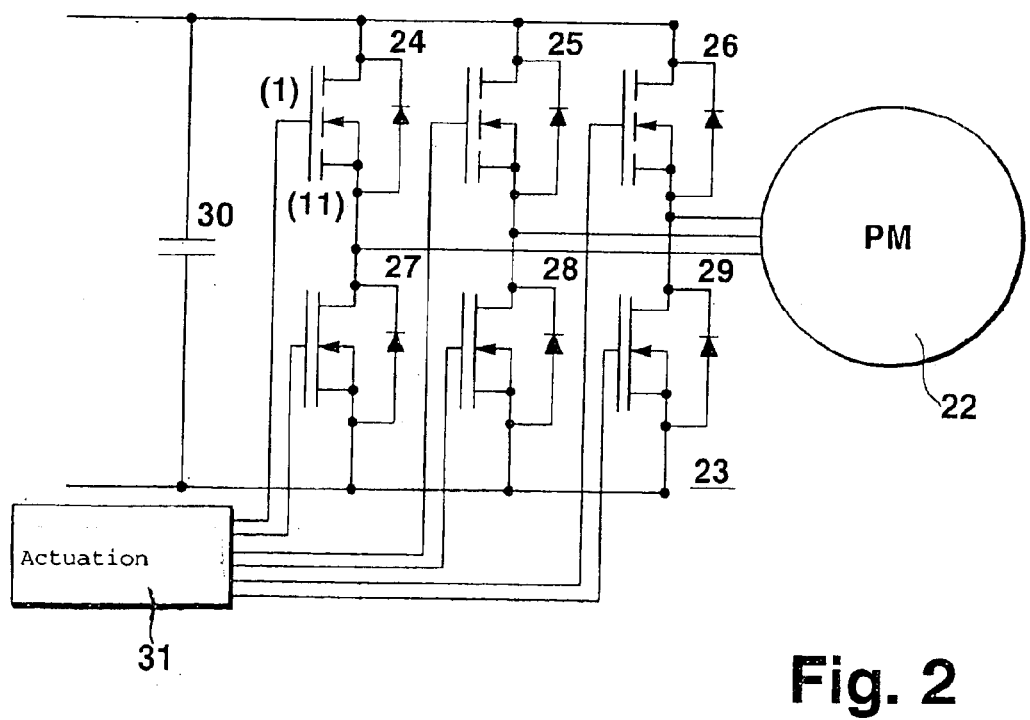
FIG. 2 shows an example of a pulse-controlled inverter having 6 MOSFETs.

FIG. 2 shows an additional example embodiment of the present invention, which corresponds generally to the conventional embodiments, but in contrast to the conventional embodiments has normally-on switching elements in the low-side branch, i.e., switching elements that are conductive when no control voltage is applied. The exemplary embodiment specifies an implementation of the inverter with self-conducting MOSFETs that have characteristics similar to those of JFETs, SITs, or various SIC components. In the exemplary embodiment according to FIG. 2 as well, a parallel connection of mechanical normally-closed contacts to normally-off switches could be employed. A possibility for example would be relay contacts that are explicitly releasable by a switch-on signal.

In detail, in FIG. 2 the electric machine, for example a permanent-field synchronous machine, is designated as 22. Inverter 23 includes a high-side branch and a low-side branch having a total of six switches 24 through 29. Charge storage is provided by an intermediate capacitor 30. The semiconductor switches are actuated with the help of an actuation electronics unit 31. Whereas in conventional systems semiconductor switches are employed which are only switched on when the voltage at control electrode 1, 11 exceeds a certain positive value compared to a reference electrode (source, cathode), according to the present invention semiconductor switches are used that are conductive when the voltage at the control electrode does not exceed any certain positive value compared to the reference electrode. That also ensures in the case of this exemplary embodiment that in the event of an error or when there is overvoltage, the low-side switches are conductive and the phases of the electric machine are short circuited even if the battery is missing or defective.

Figure 3:
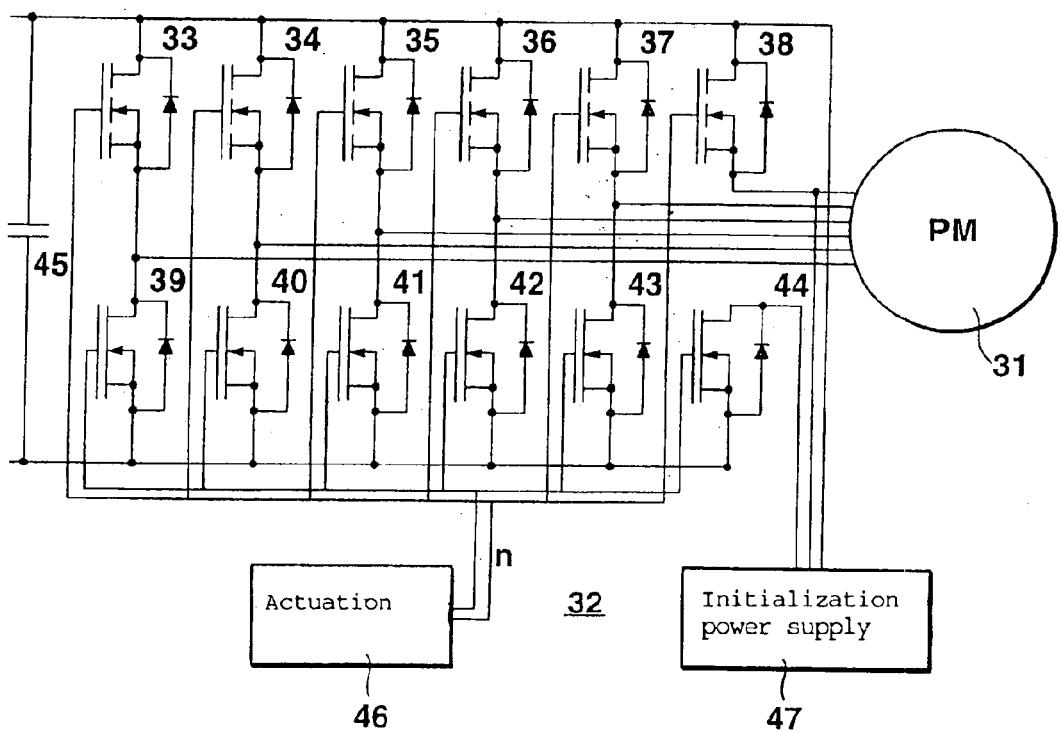
FIG. 3 shows an embodiment of the present invention having a plurality of half-bridges connected in parallel.

FIG. 3 shows an additional example embodiment of the present invention, representing a combination of mixed and pure half-bridges. The permanent-field synchronous machine is designated in this exemplary embodiment as 31. Inverter 32 includes a total of 12 switching elements 33 through 44 and an intermediate circuit capacitor 45. Switching elements 33 through 44 are actuated with the help of actuator 46. In addition, an initialization voltage supply 47 is also present. That makes it possible to design the multiphase embodiment so that the majority of the half-bridges are provided with normally-on switches in the low-side branch and one half-bridge is provided with a conventional normally-off switch, so that the limited voltage produced here may be used to switch off the other half-bridges. This combination may also be used for initializing and powering up a central control unit.

What is claimed is:

1. An inverter for an electric machine whose phase windings are connected to the inverter, the inverter comprising:

a plurality of controlled switching elements representing a bridge circuit having a high-side branch and a low-side branch, wherein at least one of the switching elements of the low-side branch is designed so that it is in a conductive state when no control voltage is present.

2. The inverter as recited in claim 1, wherein all switching elements of the low-side branch are designed so that they are conductive when no control voltage is present.

3. The inverter as recited in claim 1, wherein the at least one of the switching elements of the low-side branch is a normally-on transistor.

4. The inverter as recited in claim 3, wherein the normally-on transistor is a field effect transistor.

5. The inverter as recited in claim 1, wherein the at least one of the switching elements of the low-side branch is a relay.

6. The inverter as recited in claim 1 wherein the at least one of the switch elements of the low-side branch is a relay in parallel to a transistor.

7. The inverter as recited in claim 1, wherein the switching elements include a plurality of switching elements in a mixed bridge form having half-bridges, at least one of the half-bridges being constructed with normally-off switching elements.

8. The inverter as recited in claim 1, wherein the switching elements are actuated in normal operation via a control electronics unit.

9. The inverter as recited in claim 1, further comprising:

an initialization voltage supply configured to at least one of initialize and power up a control device.

* * * * *